(12) United States Patent
Nolan et al.

(10) Patent No.: US 8,119,263 B2
(45) Date of Patent: *Feb. 21, 2012

(54) TUNING EXCHANGE COUPLING IN MAGNETIC RECORDING MEDIA

(75) Inventors: Thomas Patrick Nolan, Fremont, CA (US); Samuel D. Harkness, IV, Berkeley, CA (US)

(73) Assignee: Seagate Technology LLC, Cupertino, CA (US)

(*) Notice: Subject to any disclaimer, the term of this patent is extended or adjusted under 35 U.S.C. 154(b) by 520 days.

This patent is subject to a terminal disclaimer.

(21) Appl. No.: 11/231,796

(22) Filed: Sep. 22, 2005

(65) Prior Publication Data

US 2007/0064345 A1   Mar. 22, 2007

(51) Int. Cl.
*G11B 5/66* (2006.01)
(52) U.S. Cl. .............. 428/829; 428/830; 428/836.2; 428/836.3; 360/135
(58) Field of Classification Search .................. None
See application file for complete search history.

(56) References Cited

U.S. PATENT DOCUMENTS

| | | | |
|---|---|---|---|
| 4,251,842 A | 2/1981 | Iwasaki et al. | |
| 4,404,609 A | 9/1983 | Jones, Jr. | |
| 4,442,159 A | 4/1984 | Dezawa et al. | |
| 4,567,083 A | 1/1986 | Arioka et al. | |
| 4,636,448 A | 1/1987 | Morita et al. | |
| 4,642,270 A | 2/1987 | Morita et al. | |
| 4,643,942 A | 2/1987 | Ohtsubo et al. | |
| 4,649,073 A | 3/1987 | Suzuki et al. | |
| 4,652,479 A | 3/1987 | Suzuki et al. | |
| 4,656,546 A | 4/1987 | Mallory | |
| 4,731,300 A | 3/1988 | Watanabe et al. | |
| 4,743,491 A | 5/1988 | Asada et al. | |
| 4,748,525 A | 5/1988 | Perlov | |
| 4,763,215 A | 8/1988 | Gueugnon et al. | |
| 4,767,516 A | 8/1988 | Nakatsuka et al. | |
| 4,982,301 A | 1/1991 | Endo | |
| 5,094,925 A | 3/1992 | Ise et al. | |

(Continued)

FOREIGN PATENT DOCUMENTS

JP   11 283 230 A   10/1999

(Continued)

OTHER PUBLICATIONS

Derwent Abstract Translation of WO 2004/090874 A1 (Derwent Acc-No. 2004-758135).*

(Continued)

*Primary Examiner* — Kevin M Bernatz
(74) *Attorney, Agent, or Firm* — Hollingsworth & Funk, LLC (57) ABSTRACT

A magnetic recording medium having a substrate, a first magnetic layer and a second magnetic layer, in this order, wherein an exchange coupling in the first magnetic layer is lower than an exchange coupling in the second magnetic layer, and the first and second magnetic layers are in a film stack so that magnetic grains in the first magnetic layer are exchange coupled by a pathway through the second magnetic layer is disclosed. A method of manufacturing a magnetic recording medium by obtaining a substrate, depositing a first magnetic layer at a first sputter gas pressure and depositing a second magnetic layer at a second sputter gas pressure, in this order, wherein the first sputter gas pressure is higher than the second sputter gas pressure, and an exchange coupling in the first magnetic layer is lower than an exchange coupling in the second magnetic layer is also disclosed.

16 Claims, 3 Drawing Sheets

U.S. PATENT DOCUMENTS

| | | |
|---|---|---|
| 5,196,976 A | 3/1993 | Lazzari et al. |
| 5,204,193 A | 4/1993 | Sato et al. |
| 5,224,080 A | 6/1993 | Ohtsuki et al. |
| 5,325,343 A | 6/1994 | Ohtsuki et al. |
| 5,329,413 A | 7/1994 | Kondoh et al. |
| 5,343,449 A | 8/1994 | Miyata et al. |
| 5,347,485 A | 9/1994 | Taguchi et al. |
| 5,486,967 A | 1/1996 | Tanaka et al. |
| 5,525,398 A | 6/1996 | Takai et al. |
| 5,567,523 A | 10/1996 | Rosenblum et al. |
| 5,636,093 A | 6/1997 | Gijs et al. |
| 5,640,374 A | 6/1997 | Hirokane et al. |
| 5,644,566 A | 7/1997 | Nakayama et al. |
| 5,659,537 A | 8/1997 | Hirokane et al. |
| 5,703,795 A | 12/1997 | Mankovitz |
| 5,830,569 A | 11/1998 | Hikosaka et al. |
| 5,981,054 A | 11/1999 | Hikosaka et al. |
| 6,117,011 A | 9/2000 | Lvov et al. |
| 6,174,597 B1* | 1/2001 | Yusu et al. .................... 428/332 |
| 6,183,893 B1 | 2/2001 | Futamoto et al. |
| 6,280,813 B1 | 8/2001 | Carey et al. |
| 6,292,329 B1 | 9/2001 | Sato et al. |
| 6,327,227 B1 | 12/2001 | Katayama et al. |
| 6,430,115 B1 | 8/2002 | Hirokane et al. |
| 6,447,936 B1 | 9/2002 | Futamoto et al. |
| 6,468,670 B1 | 10/2002 | Ikeda et al. |
| 6,495,252 B1 | 12/2002 | Richter et al. |
| 6,500,530 B1 | 12/2002 | Sawamura et al. |
| 6,528,149 B2 | 3/2003 | Yoshida et al. |
| 6,534,203 B2 | 3/2003 | Iwasaki et al. |
| 6,602,612 B2 | 8/2003 | Abarra et al. |
| 6,602,621 B2 | 8/2003 | Matsunuma et al. |
| 6,686,070 B1 | 2/2004 | Futamoto et al. |
| 6,687,067 B2 | 2/2004 | Brianti et al. |
| 6,699,600 B2 | 3/2004 | Shimizu et al. |
| 6,707,643 B2 | 3/2004 | Takeo et al. |
| 6,713,197 B2 | 3/2004 | Nakamura et al. |
| 6,716,516 B2 | 4/2004 | Futamoto et al. |
| 6,723,450 B2 | 4/2004 | Do et al. |
| 6,723,457 B2 | 4/2004 | Tanahashi et al. |
| 6,754,020 B1 | 6/2004 | Hikosaka et al. |
| 6,759,148 B2 | 7/2004 | Tanahashi et al. |
| 6,777,112 B1* | 8/2004 | Girt et al. ...................... 428/828 |
| 6,794,028 B2 | 9/2004 | Uwazumi et al. |
| 6,815,082 B2 | 11/2004 | Girt |
| 6,830,824 B2 | 12/2004 | Kikitsu et al. |
| 6,846,583 B2 | 1/2005 | Inaba et al. |
| 6,852,398 B2* | 2/2005 | Yoshida et al. ................ 428/212 |
| 6,866,948 B2 | 3/2005 | Koda et al. |
| 6,875,492 B1 | 4/2005 | Pirzada et al. |
| 6,881,497 B2 | 4/2005 | Coffey et al. |
| 6,884,520 B2 | 4/2005 | Oikawa et al. |
| 6,890,667 B1 | 5/2005 | Lairson et al. |
| 6,899,959 B2 | 5/2005 | Bertero et al. |
| 6,942,936 B2 | 9/2005 | Oikawa et al. |
| 7,056,605 B2 | 6/2006 | Kawada |
| 7,060,375 B2 | 6/2006 | Lee et al. |
| 7,070,870 B2 | 7/2006 | Bertero et al. |
| 7,105,239 B2 | 9/2006 | Oikawa et al. |
| 7,138,194 B2 | 11/2006 | Shimizu et al. |
| 7,144,640 B2 | 12/2006 | Hee et al. |
| 7,153,546 B2 | 12/2006 | Tanahashi et al. |
| 7,166,376 B2 | 1/2007 | Hikosoka et al. |
| 7,169,488 B2 | 1/2007 | Chen et al. |
| 7,183,011 B2 | 2/2007 | Nakamura et al. |
| 7,192,664 B1 | 3/2007 | Wu et al. |
| 7,226,674 B2 | 6/2007 | Koda et al. |
| 7,232,620 B2 | 6/2007 | Inomata |
| 7,261,958 B2 | 8/2007 | Hirayama et al. |
| 7,311,983 B2* | 12/2007 | Watanabe et al. ............. 428/829 |
| 7,330,335 B2 | 2/2008 | Kikitsu et al. |
| 7,332,194 B2 | 2/2008 | Takenoiri et al. |
| 7,368,185 B2 | 5/2008 | Hirayama et al. |
| 7,384,699 B2* | 6/2008 | Nolan et al. .................. 428/829 |
| 7,470,474 B2 | 12/2008 | Sakawaki et al. |
| 7,531,248 B1* | 5/2009 | Nolan et al. .................. 428/829 |
| 7,635,498 B2 | 12/2009 | Sakai et al. |
| 7,678,476 B2 | 3/2010 | Weller et al. |
| 7,736,765 B2 | 6/2010 | Wu et al. |
| 2002/0018917 A1* | 2/2002 | Sakai et al. ............. 428/694 TM |
| 2003/0017369 A1 | 1/2003 | Hirayama et al. |
| 2003/0022025 A1 | 1/2003 | Futamoto et al. |
| 2003/0064249 A1 | 4/2003 | Uwazumi et al. |
| 2003/0082410 A1 | 5/2003 | Sato et al. |
| 2003/0104247 A1 | 6/2003 | Girt |
| 2003/0108721 A1 | 6/2003 | Fullerton et al. |
| 2003/0113582 A1* | 6/2003 | Litvinov et al. ............... 428/694 |
| 2003/0180577 A1 | 9/2003 | Do et al. |
| 2003/0215675 A1* | 11/2003 | Inaba et al. ............. 428/694 TP |
| 2004/0027868 A1 | 2/2004 | Nakamura et al. |
| 2004/0086753 A1 | 5/2004 | Inomata |
| 2004/0110034 A1* | 6/2004 | Kawada ................... 428/694 R |
| 2004/0185306 A1 | 9/2004 | Coffey et al. |
| 2004/0219329 A1 | 11/2004 | Oikawa et al. |
| 2004/0224184 A1* | 11/2004 | Hikosaka et al. ....... 428/694 TM |
| 2004/0247940 A1* | 12/2004 | Chang et al. ................ 428/694 T |
| 2004/0247942 A1* | 12/2004 | Wu et al. .................... 428/694 T |
| 2004/0247945 A1* | 12/2004 | Chen et al. ............. 428/694 TS |
| 2005/0014029 A1 | 1/2005 | Takenoiri et al. |
| 2005/0019608 A1 | 1/2005 | Kim et al. |
| 2005/0037140 A1* | 2/2005 | Sakawaki et al. ............. 427/127 |
| 2005/0041335 A1 | 2/2005 | Kikitsu et al. |
| 2005/0084715 A1 | 4/2005 | Hee et al. |
| 2005/0129984 A1 | 6/2005 | Bertero et al. |
| 2005/0142378 A1* | 6/2005 | Nemoto et al. ............... 428/670 |
| 2005/0142388 A1 | 6/2005 | Hirayama et al. |
| 2005/0186358 A1 | 8/2005 | Sakai et al. |
| 2006/0090998 A1* | 5/2006 | Honda et al. ................ 204/192.1 |
| 2006/0139799 A1* | 6/2006 | Wu et al. .................... 360/97.03 |
| 2006/0204791 A1* | 9/2006 | Sakawaki et al. ........... 428/828.1 |
| 2006/0246323 A1* | 11/2006 | Liu et al. ....................... 428/829 |
| 2006/0269797 A1* | 11/2006 | Lu et al. ....................... 428/834 |
| 2006/0269799 A1* | 11/2006 | Do et al. ..................... 428/836.2 |
| 2006/0286413 A1* | 12/2006 | Liu et al. ....................... 428/829 |
| 2007/0037016 A1* | 2/2007 | Do et al. ....................... 428/828 |
| 2007/0064345 A1 | 3/2007 | Nolan et al. |
| 2007/0172705 A1* | 7/2007 | Weller et al. .................. 428/827 |
| 2007/0217067 A1* | 9/2007 | Nakamura et al. ............. 360/126 |
| 2008/0144213 A1 | 6/2008 | Berger et al. |
| 2009/0068500 A1 | 3/2009 | Kong et al. |
| 2009/0214896 A1* | 8/2009 | Nolan et al. .................. 428/832 |
| 2010/0020441 A1 | 1/2010 | Wu et al. |

FOREIGN PATENT DOCUMENTS

| | | |
|---|---|---|
| JP | 2001344725 | 12/2001 |
| JP | 2003 168207 | 6/2003 |
| JP | 2003168207 | 6/2003 |
| KR | 1020040025430 A | 3/2004 |
| WO | WO 2004/090874 A1 | 10/2004 |

OTHER PUBLICATIONS

Brandle, H., Weller, D., Scott, J., Parkin, S., C. Lin., IEEE Trans. Mag., 28(5), 1992, pp. 2967-2969.*

Zhang, Z., Wigen, P., and S. Parkin, J. App. Phys., 69(8), 1991, 5649-5651.*

Ashar, Kanu G. (1997). "Future Trends in Technology," Chapter 11 In *Magnetic Disk Drive Technology: Heads, Media, Channel, Interfaces, and Integration*. IEEE Press: New York, NY, pp. 306-333.

Written Opinion of related Singapore Application No. SG 200606515-5 dated Mar. 27, 2007 (11 pages).

Muraoka et al., "Analysis on Magnetization Transition of CGC Perpendicular Media," IEEE Transactions on Magnetics 38(4):1632-1636, Jul. 2002.

Office Action from U.S. Appl. No. 11/367,821, dated Apr. 16, 2010, 16 pp.

Response to Office action dated Apr. 16, 2010, from U.S. Appl. No. 11/367,821, filed Jul. 16, 2010, 9 pp.

U.S. Appl. No. 11/367,821, filed Mar. 3, 2006, Choe et al.

File history for U.S. Appl. No. 12/180,093, Jan. 11, 2011, 147 pages.

File history for U.S. Appl. No. 11/367,821, Jan. 11, 2011, 266 pages.

File history for U.S. Appl. No. 12/769,551, Jan. 11, 2011, 121 pages.

File history for U.S. Appl. No. 11/022,810, Jan. 11, 2011, 246 pages.

Ashar, Future Trends in Technology, Chapter 11, Magnetic Disk Drive Technology: Heads, Media, Channel, Interfaces and Integration, IEEE Press: New York, NY, pp. 306-333, 1997.

Brandle et al., Optical and Magneto-Optical Characterization of Evaporated Co/Pt Alloys and Multilayers, IEEE Trans. Mag., 28(5), Sep. 1992, pp. 2967-2969.

Zhang et al., Pt Layer Thickness Dependence of Magnetic Properties in Co/Pt Multilayers, J. App. Phys, 69(8), Apr. 1991, pp. 5649-5651.

Office Action dated Mar. 21, 2011 for U.S. Appl. No. 12/180,093, 11 pages.

Office Action Response dated May 23, 2011 for U.S. Appl. No. 12/180,093, 9 pages.

Office Action dated Jun. 2, 2011 for U.S. Appl. No. 12/180,093, 3 pages.

\* cited by examiner

Figure 1

Longitudinal Recording Bits

Perpendicular Recording Bits

TUNING EXCHANGE COUPLING IN MAGNETIC RECORDING MEDIA

FIELD OF INVENTION

The present invention relates to improved, high recording performance magnetic recording media comprising at least a weakly exchanged coupled magnetic layer and a strongly exchanged coupled magnetic layer, preferably in contact with each other. More particularly, the invention relates to hard disk recording media providing increased signal to noise ratio during magnetic recording.

BACKGROUND

Figure 1:
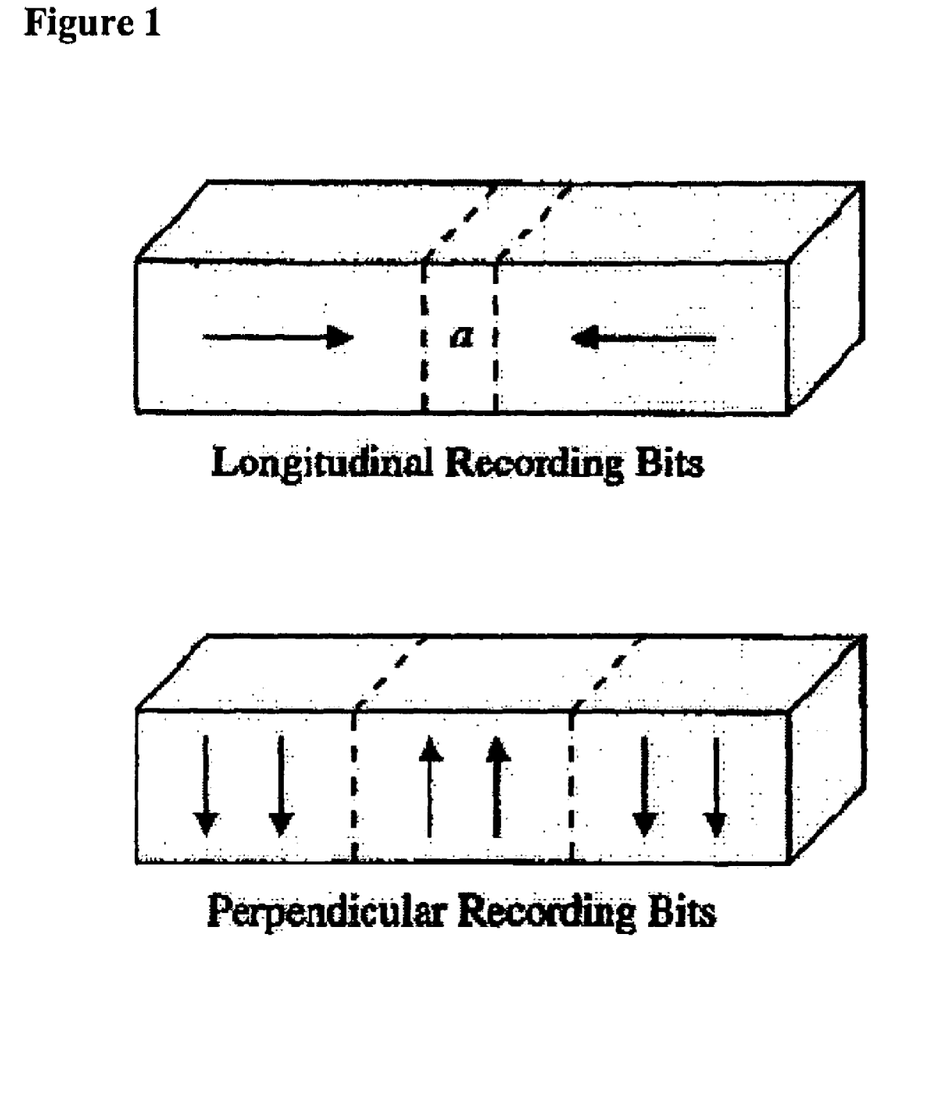
FIG. 1 shows (a) longitudinal and (b) perpendicular recording bits.

Thin film magnetic recording media, wherein a fine-grained polycrystalline magnetic alloy layer serves as the magnetic recording layer, are generally classified as "longitudinal" or "perpendicular," depending on the orientation of the magnetic domains (bits) of the magnetic grains in the magnetic recording layer. FIG. 1, obtained from *Magnetic Disk Drive Technology* by Kanu G. Ashar, 322 (1997), shows magnetic bits and transitions in longitudinal and perpendicular recording.

The increasing demands for higher areal recording density impose increasingly greater demands on thin film magnetic recording media in terms of coercivity (Hc), remanent coercivity (Hcr), magnetic remanance (Mr), which is the magnetic moment per unit volume of ferromagnetic material, coercivity squareness (S*), signal-to-medium noise ratio (SMNR), and thermal stability of the media. Thermal stability of a magnetic grain is to a large extent determined by $K_u V$, where $K_u$ is the magnetic anisotropy constant of the magnetic layer and V is the volume of the magnetic grain. V depends on the magnetic layer thickness (t); as t is decreased, V decreases. These parameters are important to the recording performance and depend primarily on the microstructure of the materials of the media.

For high signal to noise ratio (SNR) magnetic recording media, it is desirable to have small uniformly sized magnetic particles or grains; and a moderately low, uniform exchange coupling between the particles or grains. For longitudinal, perpendicular and tilted magnetic recording media, the optimal exchange coupling value is different (e.g., typically, a higher exchange coupling is desired for perpendicular recording media), but for each case, a constant, moderate value is desired between each neighboring grain.

Generally, low exchange coupling is desired so that magnetic switching of neighboring grains does not become too highly correlated. Reducing exchange coupling decreases the size of the magnetic particle or magnetic switching unit. Cross-track correlation length and media noise are correspondingly reduced. However, near-zero exchange coupling between magnetic grains produces a very low squareness sheared hysteresis loop, a broad switching field distribution, less resistance to self demagnetization and thermal decay, and low nucleation field (Hn) in perpendicular media designs. Non-uniform exchange coupling allows some grains to act independently while other grains act in clusters, resulting in broad distributions of magnetic particle size and anisotropy field.

Conventionally used storage media contain a magnetic recording layer having Co—Cr—Pt—B and Co—Cr—Ta alloys where B and Ta are mainly used to improve the segregation of Cr in the magnetic layer. The exchange coupling is controlled by preferentially forming non-ferromagnetic material at the boundaries between magnetic particles. Non-ferromagnetic material is commonly formed during sputter deposition of CoPtCrB containing alloys on high temperature substrates by preferential surface diffusion of Cr and B to grain boundaries. The Co concentration varies between the grain center and the grain boundary such that there is a transition from magnetic to non-magnetic composition. Exchange coupling in such media is controlled by changing parameters such as the Cr and B concentrations, and the substrate temperature.

Non-ferromagnetic material can also be formed at magnetic grain boundaries during sputter deposition of CoPt containing alloys on low temperature substrates, by addition of a metal oxide to the sputter target or by reactively sputtering the target in a sputter gas containing oxygen. Exchange coupling in these media is controlled by changing parameters such as sputter gas pressure, oxygen concentration in the sputter gas, and oxide concentration in the sputter target.

In any case, a better segregation profile of non-ferromagnetic material leads to a sharper transition between the magnetic grains and the non-magnetic Co-depleted grain boundaries. Correspondingly, the recording media can have higher Co concentration inside each grain.

However, there are several problems when sputter parameters are adjusted to control the amount of non-ferromagnetic material to create a significantly, but not completely, exchange decoupled magnetic particles. A magnetic material having a significantly, but not completely, exchange decoupled magnetic particles is termed as moderately exchange coupled.

One problem with such an exchange decoupling method is that the exchange between two grains is extremely sensitive to the arrangement of a very small number of atoms at the grain boundary between each pair of adjacent grains. Thus, some grains are much more strongly coupled than others. A second problem is that radial diffusion profiles depend upon the size of the magnetic grains. Thus, larger grains can have systematically different composition than smaller grains, and hence have systematically different exchange coupling and magnetic anisotropy. A third problem is that the composition of the entire film including the ferromagnetic particles, the weakly exchange coupled ferromagnetic regions between magnetic particles, and the exchange decoupling non-ferromagnetic regions between magnetic particles is substantially the same, except for the preferential lateral transport of some atomic species. Changing exchange coupling in the film generally changes the composition of the magnetic particles as well as the grain boundary material. Thus, it is difficult to separately optimize the properties of each component of the film. Also, a fourth problem exists related to the degraded mechanical robustness and corrosion resistance that arises from such prior art wherein high pressure sputter methods necessarily yield increased surface roughness. There is thus a need for a new method for the magnetic recording media that provides improved control of exchange coupling in the magnetic layer and improved recording performance while preserving media robustness.

SUMMARY OF THE INVENTION

The embodiments of the invention are directed to a longitudinal or perpendicular recording medium having an improved compositional segregation within the magnetic layers. One embodiment relates to a magnetic recording medium comprising a substrate, a first magnetic layer and a second magnetic layer, wherein an exchange coupling in the first magnetic layer is lower than an exchange coupling in the second magnetic layer. Preferably, the first and second magnetic layers are in a film stack so that magnetic grains in the first magnetic layer are exchange coupled by a pathway through the second magnetic layer.

Another embodiment relates to a magnetic recording medium comprising a substrate, a first magnetic layer and a second magnetic layer, wherein said first magnetic layer comprises regions of amorphous material and said second magnetic layer comprises substantially no amorphous material. Preferably, said first magnetic layer comprises regions of non-ferromagnetic material and said second magnetic layer comprises substantially no non-ferromagnetic material.

Yet another embodiment relates to a method of manufacturing a magnetic recording medium comprising obtaining a substrate, depositing a first magnetic layer with reactive oxidation or depositing a second magnetic layer without substantial reactive oxidation. Preferably, said first magnetic layer and said second magnetic layer comprise films deposited at different substrate temperature, further wherein the second layer comprises a film deposited at a substrate temperature greater than 50° C. Also, preferably, the depositing a first magnetic layer is at a first sputter gas pressure and the depositing a second magnetic layer is at a second sputter gas pressure, in this order, wherein the first sputter gas pressure is higher than the second sputter gas pressure, and an exchange coupling in the first magnetic layer is lower than an exchange coupling in the second magnetic layer.

As will be realized, this invention is capable of other and different embodiments, and its details are capable of modifications in various obvious respects, all without departing from this invention. Accordingly, the drawings and description are to be regarded as illustrative in nature and not as restrictive.

DETAILED DESCRIPTION

Magnetic recording media having Co—Cr—Pt—B and Co—Cr—Ta alloys contain B and Ta to improve the segregation of Cr in the magnetic layer. A better segregation profile of Cr leads to a sharper transition between the magnetic grains and the non-magnetic Cr-rich grain boundaries, and thus, the recording media is expected to have higher saturation magnetization (Ms) and magnetocrystalline anisotropy ($K_u$) and narrower intrinsic switching field distribution. Magnetic recording media having Co—Cr—Pt—MO (M is a reactive metal with oxygen) contain MO to improve the segregation in the magnetic layer. A better segregation profile of oxide leads to a sharper transition between the magnetic grains and the non-magnetic oxide-rich grain boundaries, and thus, the recording media is expected to have higher saturation magnetization (Ms) and magnetocrystalline anisotropy ($K_u$) and narrower intrinsic switching field distribution.

For perpendicular recording media, the simplest quantity to estimate exchange coupling is Hc-Hn. For a selected media structure, larger values of the quantity Hc-Hn correspond to lower exchange coupling. For prior art media having Hc~5000 Oe, a value of Hc-Hn below 2000 Oe could be considered to be strongly exchange coupled, while a media having Hn above 4000 Oe would be weakly exchange coupled. Values of Hc-Hn between approximately 2000-4000 Oe could be called moderately exchange coupled. A more accurate measurement of exchange coupling can be defined by an exchange field (Hex). Hex can be measured from hysteresis loop parameters including Hc and Hn. A good approximation of exchange field is given by the equation Hex=((1-N)*4*Pi*Ms)-(Hc-Hn). N is the demagnetization shape anisotropy coefficient of a magnetic grain that depends upon grain size and film thickness. N is known in the prior art, and has a value between 0.15 and 0.3 for most current perpendicular media designs. Low exchange coupling may be defined by Hex below about 1000 Oe. Moderate exchange coupling may be between about 1000-3000 Oe, and high exchange coupling may be above about 3000 Oe.

The embodiments of the invention comprise a method and apparatus for a magnetic recording media including a weakly exchange coupled magnetic layer and a strongly exchange coupled magnetic layer. The weakly exchange coupled magnetic layer has sufficient non-ferromagnetic material between magnetic grains that exchange coupling is lower than is optimal for a magnetic recording media. The strongly exchanged coupled magnetic layer has high exchange coupling such that substantially all of the magnetic grains are strongly exchange coupled. The strongly exchange coupled and weakly exchanged coupled magnetic layers are adjacent in the film stack so that grains in the weakly exchanged coupled magnetic layer are moderately exchange coupled by a pathway through the strongly exchanged coupled magnetic layer. That is, exchange coupling between grains in the weakly coupled magnetic layer is increased toward an optimal moderate value by their coupling connection through the strongly coupled magnetic layer.

The embodiments of the present invention are based upon the recognition that 1) exchange between the magnetic grains in the weakly exchanged coupled magnetic layer can be controlled by changing the thickness of the strongly exchanged coupled magnetic layer, without changing the composition of either layer; 2) exchange coupling through the strongly coupled magnetic layer does not depend as much upon grain size of the weakly coupled magnetic layer; 3) exchange coupling through the strongly coupled magnetic layer does not depend as much upon preferential transport of selected elements; 4) Exchange coupling through the interface between the weakly coupled magnetic layer and the strongly coupled magnetic layer involves more atoms than exchange coupling between pairs of grains in the weakly exchange coupled layer; and 5) thickness control is precise, so that the small number of atoms involved in exchange tuning is relatively easy to control.

The embodiments of the invention provide magnetic recording media suitable for high areal recording density exhibiting high SMNR. A perpendicular recording media embodiment of the invention achieves such technological advantages by forming a soft underlayer. A "soft magnetic material" is a material that is easily magnetized and demagnetized. As compared to a soft magnetic material, a "hard magnetic" material is one that neither magnetizes nor demagnetizes easily.

The underlayer is "soft" because it is made up of a soft magnetic material, which is defined above, and it is called an "underlayer" because it resides under a recording layer. In a preferred embodiment, the soft layer is amorphous. The term "amorphous" means that the material of the underlayer exhibits no predominant sharp peak in an X-ray diffraction pattern as compared to background noise. The term "amorphous" encompasses nanocrystallites in amorphous phase or any other form of a material so long the material exhibits no predominant sharp peak in an X-ray diffraction pattern as compared to background noise. The soft magnetic underlayer can be fabricated as single layers or a multilayer. The amorphous soft underlayer is relatively thick compared to other layers. The amorphous soft underlayer materials include a Cr-doped Fe-alloy-containing alloy, wherein the Fe-alloy could be CoFeZr, CoFeTa, FeCoZrB and FeCoB.

An adhesion layer could be optionally included in the embodiments of this invention. An adhesion layer is a layer lying in between the substrate and the soft underlayer. A proper adhesion layer can also control anisotropy of the soft underlayer by promoting a microstructure that exhibits either short-range ordering under the influence of a magnetron field, or different magnetostriction. An adhesion layer could also alter local stresses in the soft underlayer.

Preferably, in the soft underlayer of the perpendicular recording medium of the embodiments of the invention, an easy axis of magnetization is directed in a direction substantially transverse to a traveling direction of the magnetic head. This means that the easy axis of magnetization is directed more toward a direction transverse to the traveling direction of the read-write head than toward the traveling direction. Also, preferably, the underlayer of the perpendicular recording medium has a substantially radial or transverse anisotropy, which means that the domains of the soft magnetic material of the underlayer are directed more toward a direction transverse to the traveling direction of the read-write head than toward the traveling direction.

Amorphous soft underlayer materials lack long-range order. Without long-range order, amorphous alloys have substantially no magnetocrystalline anisotropy. The use of amorphous soft underlayer could be one way of reducing noise caused by ripple domains and surface roughness. Amorphous soft underlayers could produce smoother surfaces as compared to polycrystalline underlayers. Therefore, amorphous soft underlayer could be one way of reducing the roughness of the magnetic recording media for high-density perpendicular magnetic recording.

The surface roughness of the amorphous soft underlayer is preferably below 1 nm, more preferably below 0.5 nm, and most preferably below 0.2 nm.

In accordance with embodiments of this invention, the substrates that may be used in the embodiments of the invention include glass, glass-ceramic, NiP/aluminum, metal alloys, plastic/polymer material, ceramic, glass-polymer, composite materials or other non-magnetic materials. Glass-ceramic materials do not normally exhibit a crystalline surface. Glasses and glass-ceramics generally exhibit high resistance to shocks.

A preferred embodiment of the perpendicular recording media of the invention further includes an interlayer. The interlayer can be made of more than one layer of non-magnetic materials. The interlayer prevents an interaction between the amorphous soft magnetic underlayer and recording layer. The interlayer also promotes the desired microstructural properties of the recording layer. In some embodiments the interlayer comprises an hcp material with strong <0001> growth orientation. In a preferred embodiment the interlayer includes a Ru-containing alloy. In some embodiments a Ru-containing alloy interlayer is sputter deposited under argon pressure (PAr) greater than 20 mTorr. In some embodiments the Ru-containing interlayer comprises at least two Ru-alloy containing films sputter deposited at different PAr.

The soft underlayer and magnetic recording layer could be sequentially sputter deposited on the substrate, typically by magnetron sputtering. A carbon overcoat could be typically deposited in argon with nitrogen, hydrogen or ethylene. Conventional lubricant topcoats are typically less than about 20 Å thick.

The embodiments of magnetic recording media comprise at least two magnetic layers including at least one weakly exchange coupled magnetic layer having lower exchange than is optimal for a single-layer magnetic recording medium, and at least one strongly exchange coupled magnetic layer having exchange coupling higher than is optimal for a single-layer magnetic recording medium. The at least one weakly exchange coupled magnetic layer and the at least one strongly exchange coupled magnetic layer are deposited successively such that they are adjacent in the film stack and in direct physical contact. The weakly exchanged coupled magnetic layer is generally a cobalt and platinum containing (Co-Pt) alloy that also includes other nonmagnetic (non-ferromagnetic) elements. The weakly exchange coupled magnetic layer is deposited so as to form a compositionally segregated microstructure wherein the magnetic particles comprise higher concentrations of the Co and Pt, while the boundaries between magnetic particles comprise higher concentrations of non-magnetic elements and lower cobalt concentration, such that the boundary material is substantially non-magnetic. The strongly exchanged coupled magnetic layer has high exchange coupling such that substantially all of the magnetic grains are strongly exchange coupled. The strongly exchanged coupled magnetic layer often also comprises a Co-containing alloy. The strongly exchanged coupled magnetic layer is deposited so as to form a non-compositionally segregated microstructure or one less segregated than the weakly exchanged coupled magnetic layer. That is, the strongly exchange coupled magnetic layer has less or in some preferred embodiments, substantially no non-ferromagnetic material between ferromagnetic grains. The overall concentration of non-magnetic elements and specifically the concentration of nonmagnetic materials at magnetic particle boundaries is lower than in the weakly exchanged coupled magnetic layer case.

In one embodiment, the method of manufacturing comprises depositing adhesion layers, soft underlayers, and interlayers that optimize growth of the magnetic layer; depositing a Co-alloy magnetic layer having higher concentrations or volumes of nonmagnetic grain boundary material; depositing a Co-alloy layer having little or no non-magnetic grain boundary material; and depositing a protective overcoat.

The media of this invention have the following experimentally demonstrated advantages:

1. Exchange between the magnetic grains (as measured by the difference between Hc and Hn) can be controlled over a range greater than 4000 Oe by changing the thickness of the strongly exchanged coupled magnetic layer without changing the composition of the weakly exchanged coupled magnetic layer.
2. Exchange coupling control does not require any adjustment of preferential transport of selected elements.
3. Hc can be made to range from below 3000 Oe to above 7000 Oe.
4. Hn can be adjusted from below 0 Oe to above 3000 Oe.
5. Hn can be increased by more than 1000 Oe without any measurable loss of signal to noise ratio, by increasing only thickness of the strongly exchanged coupled magnetic layer, without changing any other composition, thickness, or sputter parameter.

6. Surface roughness is reduced and corrosion resistance is increased, compared to the high PAr single magnetic layer media of the prior art.

EXAMPLES

All samples described in this disclosure were fabricated employing DC magnetron sputtering. Carbon overcoat films were ion-beam deposited.

Oxide Perpendicular Recording Media Embodiments

Some embodiments of the perpendicular recording media of the invention include the following properties and steps:

Step 1: A soft magnetic structure including adhesion layer, soft magnetic layers, and any desired nonmagnetic lamination layers are deposited onto a substrate. In a preferred embodiment, the soft magnetic structure is 50-400 nm thick. Orienting seed layer and interlayer structures are deposited on top of the soft magnetic structure. In a preferred embodiment, the interlayer is an hcp ruthenium (Ru) containing alloy with a <0001> preferred growth orientation.

Step 2: The weakly exchange coupled magnetic layer is deposited on top of the underlayer so as to grow with an hcp <0001> preferred growth orientation. It comprises a Co—Pt containing alloy that also includes other nonmagnetic (non-ferromagnetic) elements. In a preferred embodiment, the Pt concentration is greater than about 15 atomic percent (at %). The weakly exchange coupled magnetic layer is deposited so as to form a compositionally segregated microstructure wherein the magnetic particles comprise higher concentrations of Co and Pt, while the boundaries between magnetic particles comprise higher concentrations of other non-magnetic elements and lower cobalt concentration, such that the boundary material is substantially non-magnetic. In one preferred embodiment, the nonmagnetic material comprises reactive sputtering induced CoO. In another preferred embodiment, the nonmagnetic material comprises an oxide formed from an element or oxide material included in a sputter target. In some preferred embodiments, the oxide material is selected from stable oxides including SiO2, TiO2, Ta2O5, Al2O3, WO3, Nb2O5, Al2O3, and Y2O3. In more preferred embodiments, the oxide containing nonmagnetic grain boundary material has an amorphous appearance (as observed, for example, by plan-view TEM), and comprises greater than about 10% by volume of the weakly exchange coupled magnetic layer. In other preferred embodiments, the weakly exchanged coupled magnetic layer is about 5-25 nm thick. In a more preferred embodiment, the weakly exchanged coupled magnetic layer deposition is performed at a high sputter gas pressure (e.g., >20 mTorr) upon an unheated substrate, and a thickness of the layer has Hc greater than 4000 Oe and Hn less than 25% of Hc. In a most preferred embodiment, the weakly exchanged coupled magnetic layer possesses more than 10 percent amorphous material at the grain boundary region as typically characterized by TEM. Such structure should yield exchange field (Hex) below 3000 Oe, preferably below 2000 Oe, and most preferably below 1000 Oe.

Figure 2:
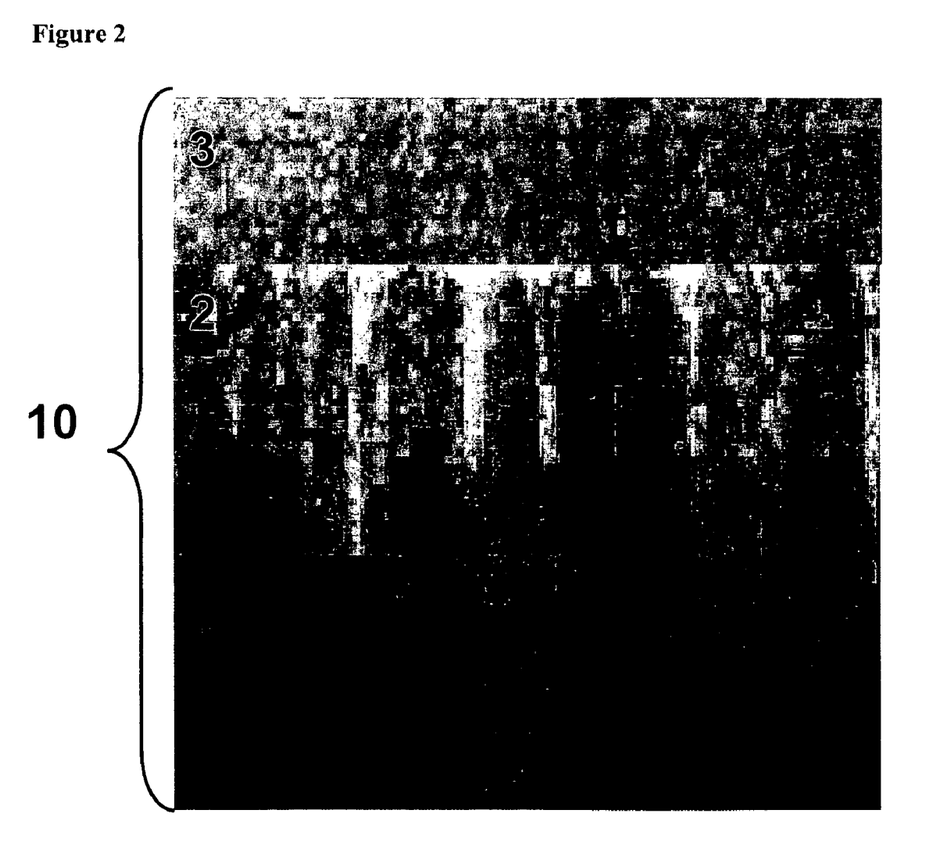
FIG. 2 shows an embodiment of a structure of media of this invention.
Figure 3:
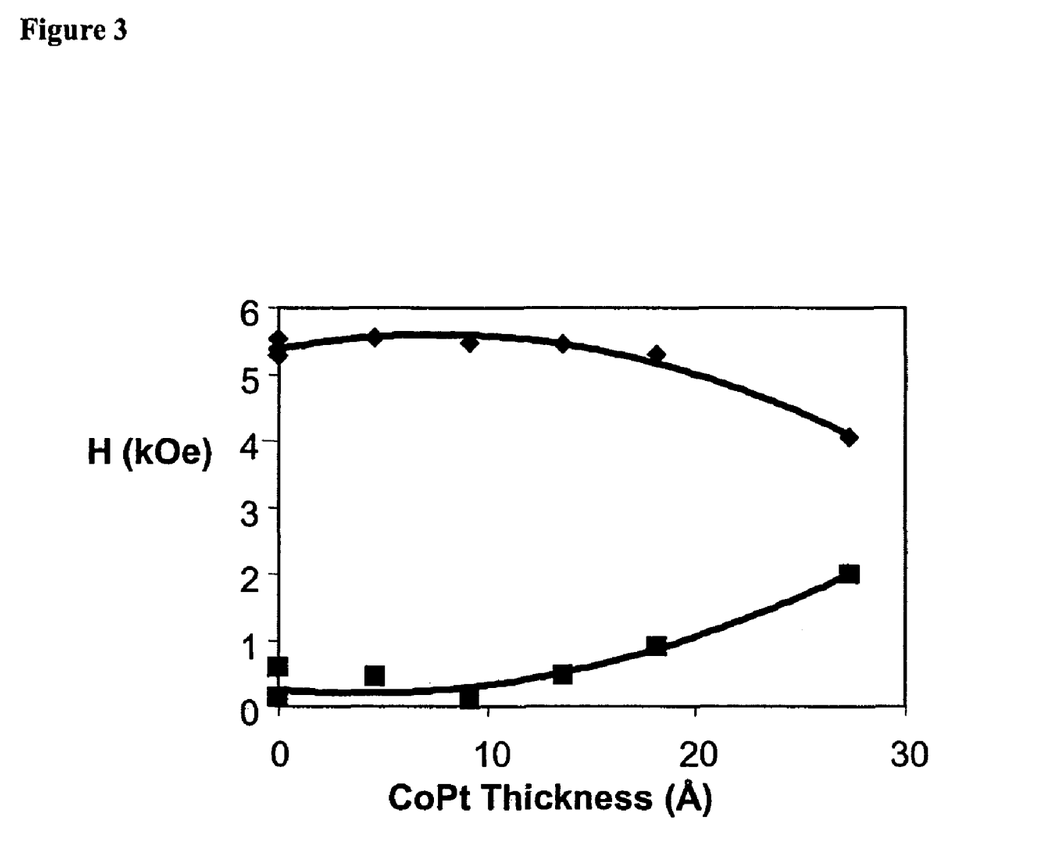
FIG. 3 shows Hc (top curve) and Hn (bottom curve) as a function of the thickness of the strongly exchange coupled magnetic layer (i.e., the top or second magnetic layer). The strongly exchanged coupled magnetic layer is a CoPt layer in the embodiment of FIG. 3.

Step 3: The strongly exchanged coupled magnetic layer has high exchange coupling such that substantially all of the magnetic grains are strongly exchange coupled. In a preferred embodiment, the strongly exchanged coupled magnetic layer also comprises a Co-containing magnetic layer. In one embodiment, the strongly exchanged coupled magnetic layer further comprises a high anisotropy <0001> growth oriented film having Pt concentration greater than 15 at %. In another embodiment, the strongly exchanged coupled magnetic layer further comprises a <0001> growth oriented film having Pt concentration less than 15 at % and anisotropy lower than that of the weakly coupled magnetic layer. The strongly exchanged coupled magnetic layer deposition is performed at a low sputter gas pressure (e.g., <20 mTorr) so as to reduce physical grain separation by "shadowing." In one preferred embodiment the strongly exchanged coupled magnetic layer is deposited without reactive oxidation so as to form a less compositionally segregated microstructure than the weakly exchanged coupled magnetic layer. In another preferred embodiment, the oxide material in the sputter target is removed, or reduced as compared to the weakly exchanged coupled magnetic layer. In the various embodiments, the overall concentration of non-magnetic elements and specifically the concentration of nonmagnetic materials at magnetic particle boundaries of the strongly coupled magnetic layer is lower than in the weakly exchanged coupled magnetic layer. In these embodiments, the exchange coupling of the full film stack is increased from the low value of the weakly exchanged coupled magnetic layer to higher values by increasing thickness of the strongly exchanged coupled magnetic layer. In a preferred embodiment, a 1-10 nm thick exchanged coupled magnetic layer could be deposited. In a most preferred embodiment, Hc of the full magnetic structure (completed media) is between 4,000 and 7,000 Oe, Hn is between 1,000 and 3,000 Oe, and Squareness S>0.95. In a preferred embodiment, there is substantially no amorphous oxide in the strongly exchanged coupled magnetic layer as observed by TEM. A schematic of the preferred media structure is shown in FIG. 2. Media 10 includes interlayer 1, weakly exchanged coupled magnetic layer 2, and strongly exchanged coupled magnetic layer 3. A demonstration of the decrease of Hc-Hn with increasing thickness of the strongly exchanged coupled magnetic layer 3 is shown in FIG. 3.

Step 4: A protective overcoat, typically comprising predominantly an amorphous C-containing alloy structure and a polymer lubricant is deposited. In other embodiments, the order of performing steps 2 and 3 could be reversed.

Other embodiments of the perpendicular recording media of the invention include steps similar to 1-4 of the previously described Oxide Perpendicular Recording Media Embodiments, except as modified below:

Step 2: A preferred embodiment employs sputter deposition at low sputter gas pressure (e.g., <10 mTorr) upon a substrate heated above 200° C. In such embodiments, the weakly exchange coupled magnetic layer comprises greater than about 15 at % Pt and greater than about 15 at % chromium (Cr). Cr further segregates to grain boundaries to form a nonmagnetic material including greater than 20 at % chromium. In a more preferred embodiment, the weakly exchanged coupled magnetic layer is about 10-25 nm thick and has Hc greater than 4000 Oe and Hn less than 25% of Hc.

Step 3: A preferred embodiment of the strongly exchanged coupled magnetic layer comprises a <0001> growth oriented Co-alloy film including Pt concentration greater than 15 at % than in the weakly exchanged coupled magnetic layer case. Exchange coupling at grain boundaries is increased by reducing or eliminating the Cr content of the deposited material. In other embodiments, Cr segregation to grain boundaries may be further reduced by addition of impurities, reactive sputtering, lowering substrate temperature or bias, or other mechanisms to reduce adatom mobility during sputter. Other embodiments of the perpendicular recording media of the invention include steps similar to 1-4 of the previously described Oxide Perpendicular Recording Media Embodiments, with modifications as noted below: the weakly exchange coupled layer may comprise two or more weakly exchange coupled thin films; the strongly exchange coupled layer may comprise two or more strongly exchange coupled thin films; a strongly exchange coupled layer deposited at high temperature may be deposited upon a weakly exchange coupled layer deposited at low temperature; a strongly exchange coupled layer deposited at high temperature may be deposited upon a weakly exchange coupled layer deposited at low temperature; two or more films comprising at least one of a strongly coupled magnetic layer and a weakly coupled magnetic layer may be deposited at different temperature.

Longitudinal Recording Media Embodiments:

Some embodiments of the longitudinal recording media of the invention include the following properties and steps:

Step 1: Oriented seed layer and underlayer structures are deposited onto a substrate, which include Cr-alloy underlayers having a body-centered-cubic (BCC) <200> growth orientation, and may also include nonmagnetic hcp materials oriented with <11.0> or <10.0> growth direction.

Step 2: The weakly exchange coupled magnetic layer could be deposited on top of the underlayer so as to grow with an hcp <11.0> or <10.0> growth direction. It comprises a Co—Pt containing alloy that also includes other nonmagnetic (non-ferromagnetic) elements. In a preferred embodiment, the Pt concentration is greater than about 10 at %. The weakly exchange coupled magnetic layer is deposited so as to form a compositionally segregated microstructure wherein the magnetic particles comprise higher concentrations of the Co and Pt, while the boundaries between magnetic particles comprise higher concentrations of non-magnetic elements and lower cobalt concentration, such that the boundary material is substantially non-magnetic. In a preferred embodiment, the weakly exchange coupled magnetic layer includes a CoCrPtB containing greater than 10 at % Pt, greater than 10 at % Cr, and greater than 5 at % B. In a more preferred embodiment, weakly exchange coupled magnetic layer deposition is performed at a low sputter gas pressure (e.g., <10 mTorr) upon a substrate heated above 200° C. In such embodiments, Cr and Boron segregate to grain boundaries to form a nonmagnetic material including greater than 15 at % chromium and 8 at % B. In a more preferred embodiment, the weakly exchanged coupled magnetic layer is about 10-25 nm thick has Hc greater than 4000 Oe and has a nonmagnetic grain boundary material including greater than 20 at % Cr. In a more preferred embodiment, greater than about 10% by volume of the weakly exchange coupled magnetic layer comprises the nonmagnetic grain boundary material having an amorphous appearance, as observed, for example, by plan-view TEM. Weakly exchange coupled magnetic layers may also include Ta, Si, O, and other alloying elements. Magnetic layers commonly include 50-70 at % cobalt, and have Ms=200-500 emu/cc.

Step 3: The strongly exchanged coupled magnetic layer has high exchange coupling such that substantially all of the magnetic grains are strongly exchange coupled. In a preferred embodiment, the strongly exchanged coupled magnetic layer comprises a <11.0> or <10.0> growth oriented Co-alloy film including Pt concentration greater than 10 at % as in the weakly exchanged coupled magnetic layer. Exchange coupling at grain boundaries is increased by reducing or eliminating the Cr and B content of the deposited material. In other embodiments, Cr segregation to grain boundaries may be further reduced by addition of impurities, reactive sputtering, lowering substrate temperature or bias, or other mechanisms to reduce adatom mobility during sputter. In the various embodiments, the overall concentration of non-magnetic elements and specifically the concentration of nonmagnetic materials at magnetic particle boundaries is lower than in the weakly exchanged coupled magnetic layer. In these embodiments, the exchange coupling of the media is increased from the low value of the weakly exchanged coupled magnetic layer to higher values by increasing thickness of the strongly exchanged coupled magnetic layer. In a preferred embodiment, a 1-10 nm thick exchanged coupled magnetic layer could be deposited.

Step 4: A protective overcoat, typically comprising an amorphous C-alloy structure polymer lubricant could be deposited according to the prior art.

In other embodiments, the order of performing steps 2 and 3 could be reversed.

This application discloses several numerical range limitations that support any range within the disclosed numerical ranges even though a precise range limitation is not stated verbatim in the specification because this invention can be practiced throughout the disclosed numerical ranges. Finally, the entire disclosure of the patents and publications referred in this application are hereby incorporated herein in entirety by reference.

The invention claimed is:

1. A magnetic recording medium comprising:
   a substrate, and a perpendicular recording layer on the substrate, wherein the recording layer comprises:
      a first magnetic layer closest to the substrate and comprising a Co-containing alloy, wherein the first magnetic layer comprises magnetic grains separated by grain boundaries of non-ferromagnetic material, wherein the non-ferromagnetic material comprises an oxide; and
      a second magnetic layer comprising a CoCr-containing alloy, wherein the second magnetic layer comprises magnetic grains separated by grain boundaries, and wherein the grain boundaries in the second magnetic layer comprise substantially no non-ferromagnetic material, such that the exchange coupling in the second magnetic layer is stronger than the exchange coupling in the first magnetic layer, and
      wherein the first magnetic layer and the second magnetic layer are in direct physical contact and Hc-Hn of the recording layer is between about 2000 Oe and about 4000 Oe.

2. The magnetic recording medium of claim 1, wherein the oxide in the first magnetic layer has an amorphous appearance as observed by plan-view TEM.

3. The magnetic recording medium of claim 1, wherein the first magnetic layer has a thickness in the range of about 5-25 nm and the second magnetic layer has a thickness greater than 1 nm and less than 10 nm.

4. The magnetic recording medium of claim 1, wherein the first magnetic layer comprises a Co-Pt containing alloy, and wherein the Co-Pt containing alloy in the first magnetic layer has a Pt concentration greater than about 15 atomic percent.

5. The magnetic recording medium of claim 1, further comprising an interlayer between the substrate and the recording layer, wherein the interlayer comprises a Ru-containing alloy.

6. The magnetic recording medium of claim 1, further comprising a soft magnetic underlayer residing under the recording layer, wherein the soft magnetic underlayer is amorphous.

7. The magnetic recording medium of claim 6, wherein the amorphous soft magnetic underlayer is an Fe-containing alloy further comprising Cr, wherein the Fe-containing alloy is selected from the group consisting of CoFeZr, CoFeTa, FeCoZrB and FeCoB.

8. The magnetic recording medium of claim 1, wherein the oxide in the first magnetic layer is selected from the group consisting of $SiO_2$, $TiO_2$, $Ta_2O_5$, $Al_2O_3$, $WO_3$, $Nb_2O_5$, $Al_2O_3$ and $Y_2O_3$.

9. The magnetic recording medium of claim 1, wherein the second magnetic layer further comprises Pt, said Pt having a concentration less than about 15 atomic percent.

10. The magnetic recording medium of claim 1, wherein the first magnetic layer and the second magnetic layer are in direct physical contact and the exchange field (Hex) of the first magnetic layer is below about 3000 Oe, and the Hex of the second magnetic layer is greater than the Hex of the first magnetic layer.

11. An apparatus comprising:
a substrate, and a perpendicular recording layer on the substrate, wherein the recording layer comprises:
a first magnetic layer closest to the substrate and comprising a CoCrPt-containing alloy with a Pt concentration of greater than about 15 at%, wherein the first magnetic layer comprises magnetic grains separated by grain boundaries of a non-ferromagnetic material comprising an oxide; and
a second magnetic layer comprising a CoCrPt-containing alloy with a Pt concentration of less than about 15 at%, wherein the second magnetic layer comprises magnetic grains separated by grain boundaries, wherein the grain boundaries in the second magnetic layer comprise substantially no oxide and non-ferromagnetic material, and wherein the exchange coupling in the second magnetic layer is stronger than the exchange coupling in the first magnetic layer; and
wherein the first magnetic layer is in direct physical contact with the second magnetic layer and Hc-Hn of the recording layer is between about 2000 Oe and about 4000 Oe; and
an interlayer between the substrate and the recording layer, wherein the interlayer comprises a Ru-containing alloy.

12. The apparatus of claim 11, further comprising a soft magnetic underlayer residing under the recording layer, wherein the soft magnetic underlayer is amorphous.

13. The apparatus of claim 12, wherein the amorphous soft magnetic underlayer is an Fe-containing alloy further comprising Cr, wherein the Fe-containing alloy is selected from the group consisting of CoFeZr, CoFeTa, FeCoZrB and FeCoB.

14. The apparatus of claim 11, wherein the oxide has an amorphous appearance as observed by plan view TEM.

15. The apparatus of claim 14, wherein the oxide in the first magnetic layer is selected from the group consisting of $SiO_2$, $TiO_2$, $Ta_2O_5$, $Al_2O_3$, $WO_3$, $Nb_2O_5$, $Al_2O_3$ and $Y_2O_3$.

16. The apparatus of claim 11, wherein the second magnetic layer has a thickness greater than one nm and less than 10 nm.

* * * * *